United States Patent Office 3,825,526
Patented July 23, 1974

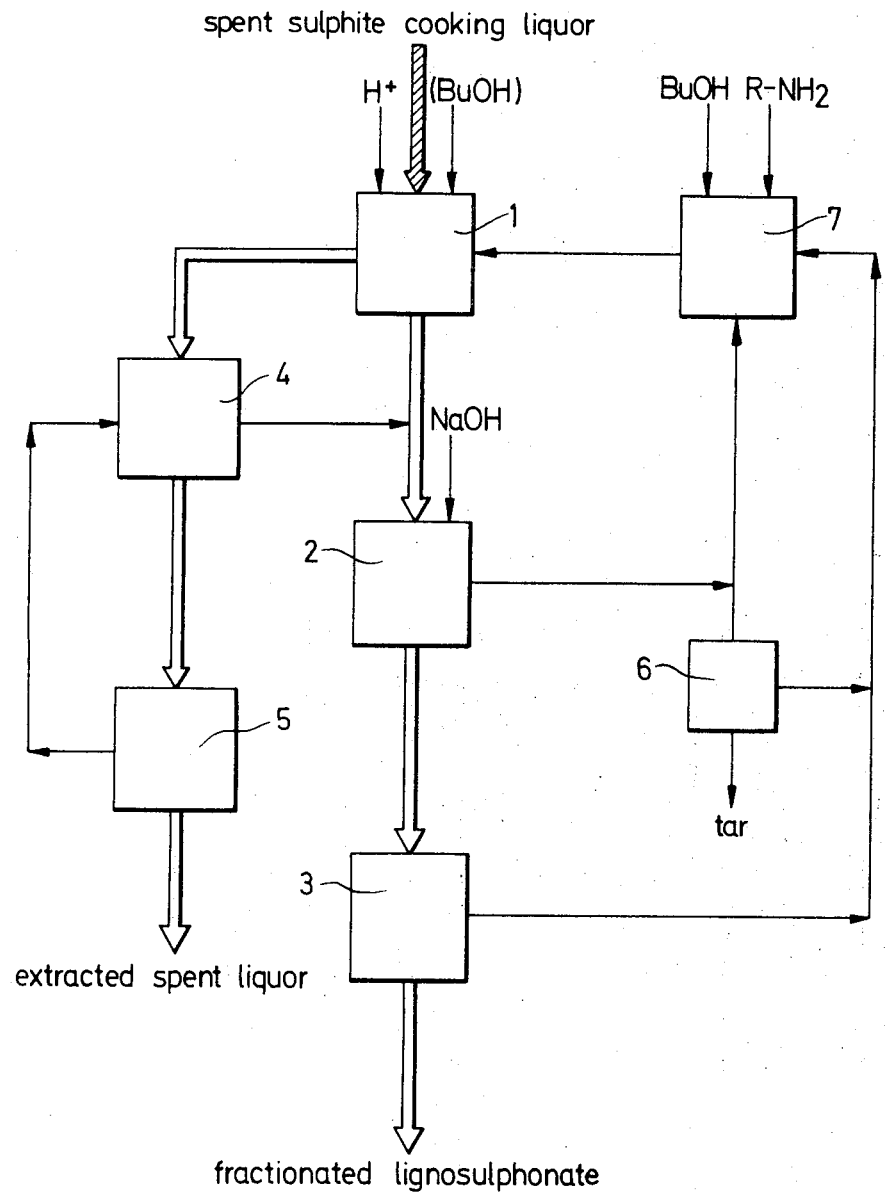

3,825,526
METHOD FOR FRACTIONATION
Kaj G. Forss, Vesakkotie 6B, Helsinki 63, Finland, and
Ilpo M. J. Pirhonen, Rinnetie B21, Mankkaa, Finland
Filed Aug. 13, 1971, Ser. No. 171,704
Claims priority, application Finland, Aug. 14, 1970,
2,238/70
Int. Cl. C07g 1/00
U.S. Cl. 260—124 R    12 Claims

ABSTRACT OF THE DISCLOSURE

The present invention relates to a method for the fractionation of lignosulphonic acids by extraction with amine-alcohol wherein butanol and dodecylamine are preferred.

Background

It is known that the spent liquor from sulphite pulping contains several valuable chemicals, as lignosulphonates, and as a consequence it is highly uneconomical to use it as a fuel, or even to dispose of it. The lignosulphonates which are wood lignin derivatives formed on the sulphite cooking, are polyelectrolytes, chemically in many respects similar to each other, but their molecular weights may vary from a few hundreds to several hundred thousands. Lignosulphonates can be utilised for example for the manufacture of vanillin, as tanning agent and dispersant. It has been noted in the investigations that lignosulphonate fractions the molecular weights of which are within the range of 5000–50,000, display the best dispersing capacity. The dispersing capacity of lignosulphonates having a higher and especially lower molecular weight is considerably weaker. As lignosulphonates the dispersing capacity of which is weak may often constitute even a half of the lignosulphonates of a solution the task has been to seek and develop a method by which solutions containing lignosulphonates can be fractionated according to molecular weight in large scale.

With this in view, the previously known method of extraction with amine-alcohol has been applied. To render the technical background of the invention comprehensible, a description is here provided of the general principle of amine-alcohol extraction. In the process the free or liberated lignosulphonic acids are first reacted with amines, to form substances which are not easily dissolved in water but which can be easily dissolved in alcohols. The amine compounds of lignosulphonic acids are decomposed under the action of alkali; whereat the alkali salt of lignosulphonic acids and free amine is formed. Since these reactions occur in two separate phases, it is possible to isolate the lignosulphonic acids, or a part of them, from a solution, such as the spent liquor from sulphite cooking. The phases concerned are an aqueous phase (aq) and an alcohol phase (org.). The sequence is described by the following chemical reactions:

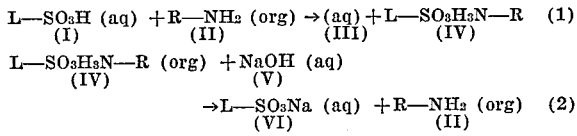

The acid solution containing lignosulphonic acids (I) is mixed with the alcohol solution of the amine (II). The lignosulphonic acids react with the amine with the formation of substances that are extracted into the organic phase (IV). In the case of spent sulphite liquor, besides the non extracted lignosulphonic acids, also other components of the spent liquor, as sugars, saccharic acids, uronic acids and acetic acid, are retained in the aqueous phase (III). The organic phase (IV) that contains the extracted amine-lignosulphonate compounds, is separated from the aqueous phase (III) and mixed with the water solution (V) of alkali hydroxide. The alkali lignosulphonate formed passes into the aqueous phase (VI), whereas the amine is liberated into the original state (II).

In the U.S. Pat. 3,251,820 representing the prior art, the extraction is carried out by aliphatic amine which is practically insoluble in water, dissolved in an aliphatic, 8–16 carbon atoms containing alcohol that is practically insoluble in water. By the method concerned it has become possible to isolate and fractionate into fractions lignosulphonates contained in the spent sulphite cooking liquor. These fractions are different from each other in regard to the sulphur content. Also the yield of vanillin was different for different fractions.

It has now been observed in the investigations that by extracting lignosulphonic acid solutions by amine dissolved in alcohol, the high-molecular lignosulphonic acids are extracted in the first place and thereafter the low-molecular ones. It has been observed unexpectedly in this connection that the amine alcohol extraction is preferably carried out by using as alcohol butanol which is not insoluble in water but of which 7.7 percent by weight is soluble in water and which dissolves water 20 percent by weight. This is contrary to what has been stated in the above-mentioned U.S. patent, according to which it is appropriate to use water-insoluble alcohol with a view to providing against losses of amine and alcohol. It has namely been observed that the insolublility of the alcohol in water does not ensure that the alcohol is fully retained as a phase of its own, as the alcohol is easily emulsified into the water by the agency of the lignosulphonates. From the viewpoint of economy in the process it is not important that the alcohol used for extraction is as difficult as possible to dissolve in water, it is instead important that it can be recovered as easily and completely as possible. Therefore it is advantageous that the alcohol used is distillable under atmospheric pressure below 150° C. and should also be distillable by steam distillation. It is particularly surprising and unexpected to a person skilled in the art that by extracting lignosulphonic acids, with butanol dodecylamine solution the lignosulphonic acids become extracted with a much smaller amount of amine than that implied by their equivalent weights. This is due to the fact that the butanol dodecyl amine solution saturated with water, is to a much higher degree a waterlike phase than the amine alcohol solutions used in the above-mentioned U.S. specification, in which alcohols have 8–16 atoms of carbon. When using butanol and dodecyl amine the lignosulphonic acid, already partly neutralized with amine, passes back into the organic phase whereas extraction by utilisation of higher alcohol implies that all sulpho groups of the lignosulphonic acids to be extracted must be neutralized with amine.

Brief Summary of the Invention

The amine-alcohol extraction according to the invention is in the first place characterized in that the extraction is carried out with butanol solution of dodecyl amine and that dodecyl amine is used for the extraction of all fractions not more than 25 percent by weight based upon the solids content of the original solution containing ligno-sulphonates, whereat lignosulphonates having a definite molecular weight distribution can be isolated.

It is a considerable advantage in the method according to the present invention that for the extraction of the desired lignosulphonate amount only a small part of the amine amount is needed than is used in the method representing the present prior art. Consequently, in the method according to the invention it is possible to proceed with a considerably smaller quantity of amine alcohol solution, which furthermore, in view of the easy recovery of butanol results in considerable savings in capital and operating costs.

Drawing

The drawing illustrates in block form the flow diagram for a preferred embodiment of this invention.

Description

The invention is furthermore clarified as follows:

As the solution containing free lignosulphonic acids is utilised a spent liquor from sulphite pulping. To reduce the pH, the spent liquor has been treated by known methods with an acid, such as hydrochloric, sulphuric or sulphurous acid, in such a manner that the hydrogen ion concentration of the spent liquor corresponds at least to the concentration of sulpho groups in the lignosulphonates to be extracted. As the solution containing lignosulphonic acids a solution can also be used which contains lignosulphonic acids manufactured from sulphate lignin. The pH of the solution after extraction must not exceed the value pH=3.

The concentration of the amine used in the extraction exercises an influence upon the yield of lignosulphonates. The yield of lignosulphonates is improved when a concentrated amine solution is employed. In the method invented it is of advantage to employ in the extraction a butanol solution of dodecylamine of concentration 3–15 percent by weight, the most favourable level being about 7 percent by weight. It needs to be mentioned that the butanol solution of dodecylamine can be saturated with water.

Both the extraction and the decomposition are best effected at temperatures of about 70° C.

An excess of alkali must be utilised for decomposition of the amine-lignosulphonate adduct. In the method invented it is of advantage to employ sodium hydroxide added being at least 60 percent of the amount of amine in the amine lignosulphonate to be decomposed. The amine compounds of the lignosulphonates do not decompose completely if the solutions of sodium hydroxide employed are too dilute. Moreover, if dilute solutions of alkali are used, the organic phase and the water phase easily form emulsions.

Since some butanol is dissolved in water, this dissolved proportion evades both the extraction and decomposition stages; this butanol is recoverable by distilling it as an azeotrope.

It has been noted that also the amine evades to some extent both the extraction and decomposition steps. The amine passes the extraction stage as its amine lignosulphonate compound. If required, it is recoverable by washing the extracted solution with butanol. Ten percent of butanol, based upon the volume of the washed solution, is adequate for the washing. The amine passes the decomposition stage in its initial state. If desired, it is recoverable by steam distillation. On the steam distillation of dodecylamine, the amount of amine removed corresponds to about 3 percent of the weight of the condensate.

It has also been observed that, in addition to the amine compounds, other subsatnces are also extracted into the alcohol solution of the amine from the sulphite spent liquor. These extraneous substances do not return to the water phase in the decomposition step. If large amounts of these substances accumulate in the alcohol solution of the amine, they may interfere with the extraction process. However, these substances may, if required, be separated from the alcohol solution of the amine by distilling off the alcohol and the amine. Water insoluble substances extracted from the spent liquor then remain as a distillation residue.

Continuous fractionation of the lignosulphonates is best effected in an extraction system of mixer-settler type. The extraction process is divisible into three fundamental parts, viz. (1) the extraction and decomposition of the lignosulphonates, (2) the washing and distillation of the extracted spent liquor, and (3) the purification and standardisation of the alcohol solution of the amine.

An application and equipment for the realization of the method according to the invention is described as follows with reference to the attached drawing, which illustrates a flow sheet of the alcoholic extraction of lignosulphonic acids.

In this equipment, the reference numeral 1 refers to the extraction stage. The spent liquor from sulphite cooking, the acid required to reduce its pH, and possibly the butanol required to saturate the spent liquor, are fed into said extraction stage. In the extraction, the lignosulphonates are extracted into the butanol phase as their amine compounds. This phase is separated from the water phase and passed to the decomposition stage 2. A water solution of an alkali is also fed to the decomposition stage 2, whereby the amine-lignosulphonate adducts are decomposed. The lignosulphonates pass into the water phase, whereas the amine is retained in the butanol phase. The water phase, which contains not only the lignosulphonates but also escaped butanol and amine, is transferred to distillation stage 3, where the butanol and the amine are recovered as an azeotrope boiling at 92° C., and the amine is steam-distilled at 100° C. The water solution containing fractionated lignosulphonates is drawn off from the process; this may occur subsequent to neutralisation on a weakly acid cation exchanger. The amines and butanol recovered are led to standardisation system 7 of the amine solution. The extracted spent liquor is led from extraction stage 1 to washing stage 4, where it is washed with butanol obtained from distillation step 5. The butanol solution obtained from washing stage 4 is transferred to decomposition stage 2, and the washed spent liquor to butanol recovery distillation 5. After removal of the saturation-butanol, the extracted spent liquor is removed from the process. The alcohol solution of the amine is regenerated in decomposition stage 2, from where it is led to standardisation system 7 of the amine solution. Substances extracted from the alcohol solution of the amine, which in the decomposition stage do not pass into the water phase, are removed, if necessary, in distillation step 6. From here, the distilled butanol and amine are led to standardisation system 7, the butanol solution of the amine is restored to its initial concentration by the addition of fresh amine and/or butanol, following which it is re-used for extractions. It should be remarked that the butanol solution of the amine circulating in the system is saturated with water.

The process illustrated in the flow sheet produces a single fraction only. In the event that several lignosulphonate fractions are desired from the same spent liquor, increase is necessary in the number of extraction and decomposition equipment-parts. In these instances, the extracted spent liquor derived from extraction stage 1 is passed to the extraction stage of the next extraction-decomposition part. When several fractions are extracted, the number of other main equipment-parts in the system need not be augmented.

The following example illustrates the specific embodiments of the invention, without any intention being implied of its limitation beyond what is required by the scope of the claims appended.

Example No. 1

An amount of 2 kg. of spent liquor obtained in the calcium bisulphite cooking of sprucewood (solids content of the liquor 7.06 perecnt by weight, 1.036 g./cm.$^3$, 2.90 g. Ca per litre) was used. To this solution was added an amount of sulphuric acid equivalent to that of the calcium present, and successively extracted five times with a solution of dodecylamine in butanol. The quantity of amine employed in each extraction step was 6.29 g. (33.6 mequiv.). The total amount of amine was 31.45 kg. (169 mequiv.), corresponding to the equivalent weight of the lignosulphonic acids present in the solution to be extracted. The amine-lignosulphonate compounds derived were decomposed by the introduction of 10 percent sodium hydroxide in excess to their butanol solution. Subsequent to the decomposition, the excess of alkali was removed by ion-exchange from the lignosulphonate fractions obtained. Tables 1 and 2 list the molecular weight distributions and yields for each fraction obtained. Calculations were also made of the amount of amine (g./kg. LSA) required to extract each specific fraction. Table 3 lists the values of the U.S.A. Pat. 3,251,820 in the form corresponding to the example of this patent application. In comparing the Tables 2 and 3, with one another it can be observed e.g. that in extracting by the method according to U.S. Pat. 3,251,820 (Example II); 1049 g.

$$R-NH_2/kg.$$

LSA fraction was needed for the extraction of the first fraction, whereas for the extraction of approx. corresponding fraction by the method according to the invention only 278 g. $R-NH_2/kg.$ LSA was needed.

3. A method as defined in Claim 2 wherein the step of contacting with a sufficient quantity of butanol comprises presaturation of the lignosulphonic acid solution with butanol prior to the step of contacting the lignosulphonic acids with a solution of dodecylamine in butanol.

4. A method as defined in Claim 2 wherein the solution of dodecylamine in butanol is at a sufficiently low concentration that a portion of the butanol can saturate the solution with lignosulphonic acids.

5. A method as defined in Claim 2 wherein the butanol solution contains dodecylamine in the range of from about 3 to 15% by weight.

6. A method as defined in Claim 5 comprising the step of decomposing the amine-lignosulphonic acid compounds with a strong base in a proportion no less than about 60% of the amount of amine in the amine-lignosulphonate to be decomposed.

TABLE I.—MOLECULAR-WEIGHT DISTRIBUTIONS OF LIGNOSULPHONATES IN THE INITIAL SPENT LIQUOR AND THE FRACTIONS OBTAINED THEREFROM

| Sample | Used $R-NH_2$, percentage of total amount | $R-NH_2$, Percentage of total solids content of original spent liquor | Percentage of sample with— | | |
|---|---|---|---|---|---|
| | | | M, >10,000 | M, >5,000 | M, >2,700 |
| Unfractionated spent liquor | 0 | 0 | 38.8 | 56.9 | 71.5 |
| Fraction: | | | | | |
| 1 | 20 | 4.6 | 72.5 | 80.5 | 86.0 |
| 2 | 40 | 9.2 | 62.4 | 76.2 | 84.1 |
| 3 | 60 | 13.8 | 44.6 | 70.0 | 83.5 |
| 4 | 80 | 18.4 | 16.0 | 42.7 | 68.0 |
| 5 | 100 | 23.0 | 5.0 | 18.4 | 48.3 |

TABLE II.—YIELDS OF EXTRACTED LIGNOSULPHONATE FRACTIONS

| Fraction | Used $RNH_2$ percentage of total amount | Yield of lignosulphonates, g. | Cumulative yield of— | | | G. $R-NH_2$ / kg. LSA |
|---|---|---|---|---|---|---|
| | | | Lignosulphonates, g. | Lignosulphonates, percentage of total amount | Lignosulphonic acids, percentage of total solids content of spent liquor | |
| 1 | 20 | 22.50 | 22.50 | 28.1 | 15.9 | 278 |
| 2 | 40 | 19.84 | 42.34 | 52.8 | 30.0 | 314 |
| 3 | 60 | 16.44 | 58.78 | 73.4 | 41.6 | 388 |
| 4 | 80 | 12.32 | 71.10 | 89.0 | 50.4 | 499 |
| 5 | 100 | 8.94 | 80.04 | 100.0 | 56.6 | 703 |

TABLE III

[Yields of extracted lignosulphate fractions in the examples of U.S. Patent 3,251,820]

| | Used $RNH_2$, percentage of total amine amount | Yield of lignosulphonates, g. | Cumulative yield of— | | | G. $R-NH_2$ / kg. LSA |
|---|---|---|---|---|---|---|
| | | | Lignosulphonares, g. | Lignosulphonatts, percentage of total amount | Lignosulphonic acids, percentage of total solids content of spent liquor | |
| Example 1: | | | | | | |
| Fraction: | | | | | | |
| 1 | 33.3 | 437.4 | 437.4 | 51.8 | 26.5 | 1,099 |
| 2 | 66.6 | 308.7 | 746.1 | 88.3 | 45.2 | 1,555 |
| 3 | 99.9 | 98.5 | 844.6 | 100.0 | 51.1 | 4,896 |
| Example 2: | | | | | | |
| Fraction: | | | | | | |
| 1 | 16.7 | 228.8 | 228.8 | 24.6 | 11.1 | 1,049 |
| 2 | 33.3 | 235.0 | 463.8 | 49.8 | 22.4 | 1,022 |
| 3 | 50.0 | 188.7 | 652.5 | 70.1 | 31.5 | 1,272 |
| 4 | 66.7 | 190.6 | 843.1 | 90.5 | 40.7 | 1,257 |
| 5 | 83.4 | 61.2 | 904.3 | 97.1 | 43.7 | 3,919 |
| 6 | 100.0 | 26.9 | 931.2 | 100.0 | 45.0 | 8,920 |

We claim:

1. A method for fractionating lignosulphonic acids in aqueous phase by contacting the aqueous phase with an organic phase consisting essentially of dodecylamine in butanol in which water is partly dissolved and wherein the quantity of dodecylamine used for extraction of each fraction is at most about 25% by weight based upon the total solids content of the original solution containing lignosulphonates.

2. A method as defined in Claim 1 further comprising the step of contracting the lignosulphonic acid solution with a sufficient excess of butanol for saturation thereof.

7. A method as defined in Claim 2 wherein the butanol solution contains about 7% by weight of dodecylamine.

8. A method as defined in Claim 1 wherein the solution containing free lignosulphonic acids is a spent liquor from the sulphite cooking of wood and comprising the additional step of pretreating the liquor with an acid selected from the group consisting of hydrochloric, sulphuric and sulphurous acid to lower its pH to a level such that the hydrogen ion concentration of the spent liquor at least corresponds to the concentration of sulpho groups in the lignosulphonate to be extracted.

9. A method as defined in Claim 1 wherein the process is effected in a continuous manner comprising the steps of:
  feeding the lignosulphonate solution and a sufficient quantity of acid to lower its pH to a level such that the hydrogen ion concentration of the solution at least corresponds to the concentration of sulpho groups in the lignosulphonate to be extracted to an extraction stage;
  feeding the dodecylamine-butanol solution to the extraction stage;
  removing the butanol phase from the extraction stage to a decomposition stage;
  feeding an aqueous solution of alkali into the decomposition stage;
  transferring the aqueous phase from the decomposition stage to a first distillation stage;
  distilling butanol and dodecylamine in the distillation stage;
  adding the distilled dodecylamine and butanol to a standardization system;
  washing the aqueous phase from the extraction stage with butanol;
  recycling the butanol phase from the washing step to the decomposition stage;
  distilling the aqueous solution from the washing step and recovering butanol therefrom; and
  reusing the recovered butanol in the washing step.

10. A method as defined in Claim 9 comprising the additional step of distilling butanol and dodecylamine from the decomposition stage and adding the distilled dodecylamine and butanol into the butanol solution of regenerated dodecylamine in the standardization system.

11. A method as defined in Claim 9 wherein a series of extraction steps and decomposition steps are performed for concurrent extraction of several distinct fractions of lignosulphonates.

12. In a method for fractionation of lignosulphonic acids according to molecular weights by fractionating an aqueous liquid containing free lignosulphonic acids with a liquid containing an aliphatic amine component and an alcoholic component wherein the amount of amine component is substantially lower than the equivalent amount with respect to the molecular weight of the lignosulphonic acids in which method the alcoholic phase containing the amine of the lignosulphonic acid is separated from the aqueous phase, the lignosulphonic acids of the separate fractions are liberated with the addition of a base stronger than the amine and the fractionated lignosulphonic acids are recovered, the improvement wherein the alcoholic component consists essentially of butanol, the amine is dodecylamine and wherein the quantity of dodecylamine used for extraction of each fraction is at most about 25% by weight.

References Cited

UNITED STATES PATENTS 3,251,820   5/1966   Grangaard _____ 260—124

OTHER REFERENCES

Harris et al., "Ind. & Eng. Chem.," vol. 49 (1957), p. 1393.

Eisenbraun, TAPPI, vol. 46, No. 2, February 1963, pp. 104–107.

LEWIS GOTTS, Primary Examiner

D. R. PHILLIPS, Assistant Examiner

U.S. Cl. X.R.

210—21; 260—583 N

UNITED STATES PATENT OFFICE
CERTIFICATE OF CORRECTION

Patent No. 3,825,526                          Dated July 23, 1974

Inventor(s) Kaj G. Forss, et al.

It is certified that error appears in the above-identified patent and that said Letters Patent are hereby corrected as shown below:

Column 1, line 57, after the equation "+L-SO3H3N-R" and before "(1)" insert --(org)--;

Columns 5 and 6, line 4 in Table III, "Lignosulphonatts" should be --Lignosulphonates--;

Columns 5 and 6, line 7 in Table III, "Lignosulphonares" should be --Lignosulphonates--;

Column 5, line 74, "contracting" should be --contacting--.

Signed and sealed this 3rd day of December 1974.

(SEAL)
Attest:

McCOY M. GIBSON JR.                    C. MARSHALL DANN
Attesting Officer                      Commissioner of Patents